United States Patent [19]

Iida et al.

[11] 4,253,541

[45] Mar. 3, 1981

[54] STEERING CONTROL SYSTEM FOR AN UNMANNED VEHICLE

[75] Inventors: Katsuhiro Iida, Isehara; Takao Kamide; Shinichi Hitomi, both of Hiratsuka, all of Japan

[73] Assignee: Kabushiki Kaisha Komatsu Seisakusho, Tokyo, Japan

[21] Appl. No.: 948,323

[22] Filed: Oct. 4, 1978

[30] Foreign Application Priority Data

Oct. 7, 1977 [JP] Japan ............................... 52/120702

[51] Int. Cl.$^3$ ............................................... B62D 1/24

[52] U.S. Cl. ..................................... 180/168; 318/587

[58] Field of Search ....................... 180/167, 168, 169; 318/587, 580

[56] References Cited

U.S. PATENT DOCUMENTS 3,669,209 6/1972 Brooke ................................ 180/168

3,993,156 11/1976 Rubel .................................. 180/168

4,040,500 8/1977 Blakeslee ............................. 180/168

*Primary Examiner*—John J. Love

*Assistant Examiner*—Michael Mar

*Attorney, Agent, or Firm*—Spensley, Horn, Jubas & Lubitz

[57] ABSTRACT

A steering control system of a type wherein an unmanned vehicle is transferred from one cable to another of two crossing cables by a programmed turning operation. According to the invention, a smooth transferring of the vehicle from the programmed turning to a guided travel along the other cable can be achieved. Conditions for the transferring of the vehicle are: (a) an output of a posture angle detection coil is within a predetermined low range, (b) the vehicle has moved by a predetermined distance after starting of the programmed turning and (c) the vehicle is not out of course, i.e. an output of a reference phase detection coil is greater than a preset value.

11 Claims, 21 Drawing Figures

STEERING CONTROL SYSTEM FOR AN UNMANNED VEHICLE

BACKGROUND AND SUMMARY OF THE INVENTION

This invention relates to a steering control system for an unmanned vehicle.

A programmed turning system employing a trapezoid function turning program as shown in FIG. 1 is known in the art as a steering control system in which at the intersection of guide cables an un-manned vehicle is turned so as to be shifted from one guide cable to the other guide cable.

In this conventional system, after the guide travelling operation of the vehicle along one of the guide cables has been released, a programmed turning operation of the vehicle is carried out for the other guide cable in accordance with a vehicle turning program. When the turning operation is finished (or the steering angle becomes zero), the guide travelling operation along the other guide cable is effected immediately. In this system, it is difficult to smoothly switch the programmed turning operation over to the guide travelling operation. Therefore, the conventional system is disadvantageous in that after the programmed turning operation has been switched over to the guide travelling operation along the other guide cable, the vehicle is liable to move along a wandering course.

In view of the foregoing, an object of this invention is to provide a steering control system for an unmanned vehicle in which the programmed turning operation can be smoothly changed over to the guide travelling operation.

It is another object of the invention to provide a steering control system for an unmanned vehicle which is capable of transferring the vehicle smoothly between a main cable and any one of cables intersecting with the main cable by utilizing the above described steering control system.

In this invention, the conventional system in which th programmed turning operation is switched over to the guide travelling operation when completed is not employed. That is, in the steering control systems according to the invention, irrespective of the completion of the programmed turning operation (even during the programmed turning operation, or even if it passes more or less after the completion of the progammed turning operation), the programmed turning operation is switched over to the guide travelling operation when the vehicle reaches the guide cable, thereby to smoothly change the operations.

In the following description of this invention, the term "turning angle" as used herein is intended to mean the amount of change in direction of the vehicle with respect to the state of the vehicle which is about to start the turning operation. The term "predetermined turning angle" is intended to mean a turning angle required for the vehicle to shift to the other guide cable in such a manner that the vehicle is in parallel with the other guide cable. Furthermore, a turning program such that a programmed turning is completed with the vehicle shifted onto the other cable, being in parallel with the other cable, will be referred to as "a turning program with the predetermined turning angle". In addition, a turning program such that a program turning is completed before the vehicle is shifted onto the other cable will be referred to as "a turning program having a turning angle less than the predetermined turning angle".

Figure 4:
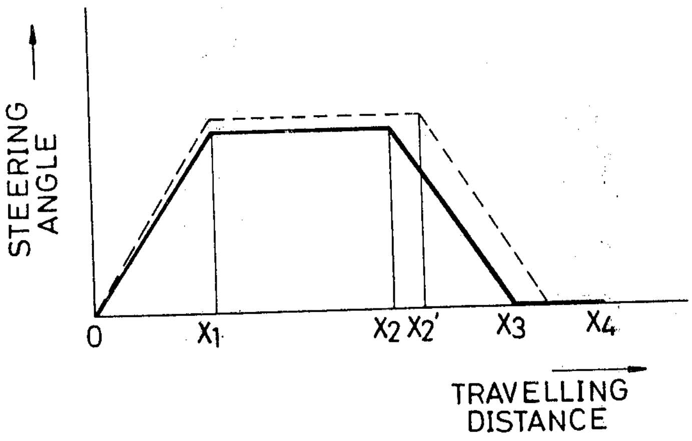
Figure 5:
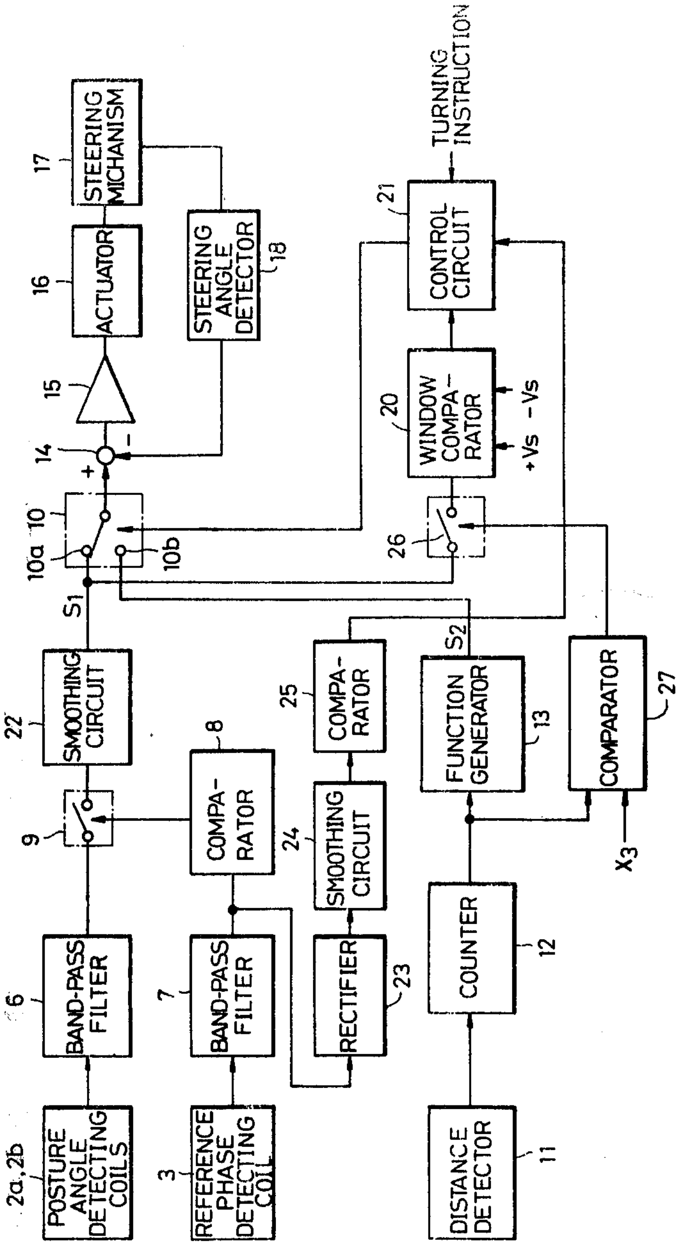
Figure 6:
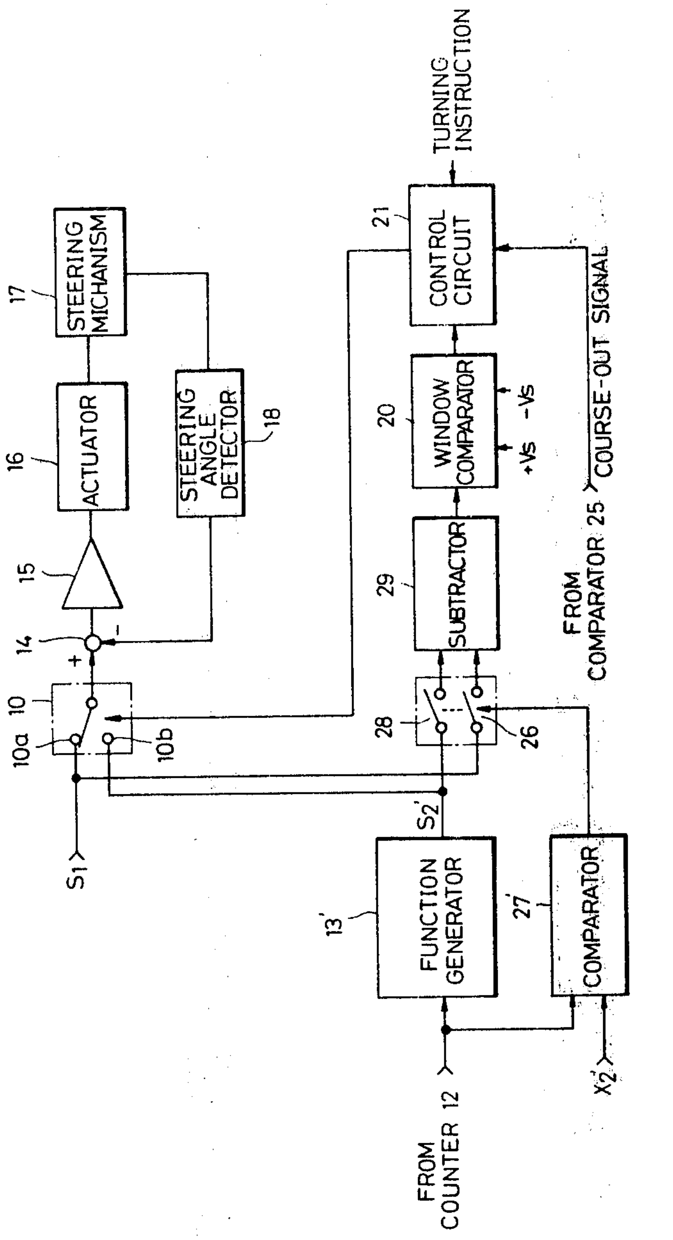
Figure 7:
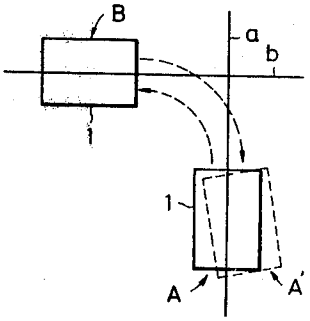
Figure 8:
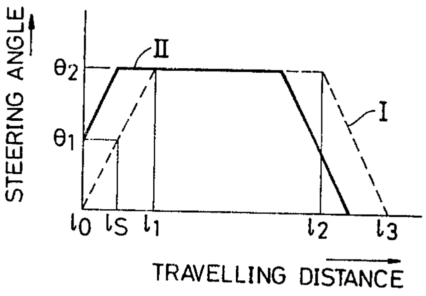
Figure 9:
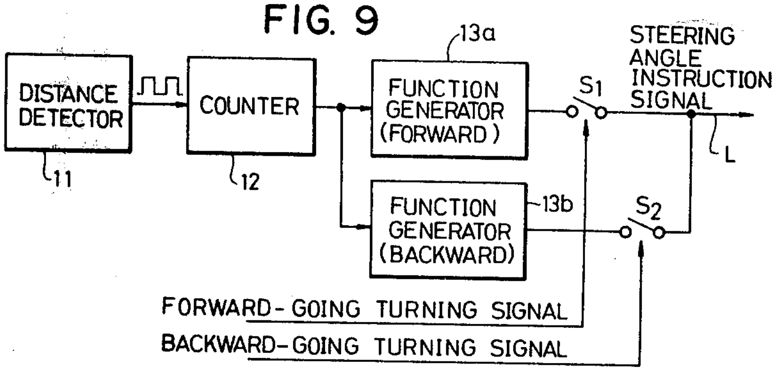
Figure 10:
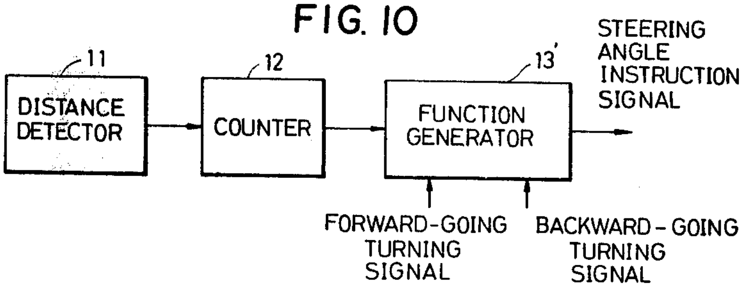
Figure 11:
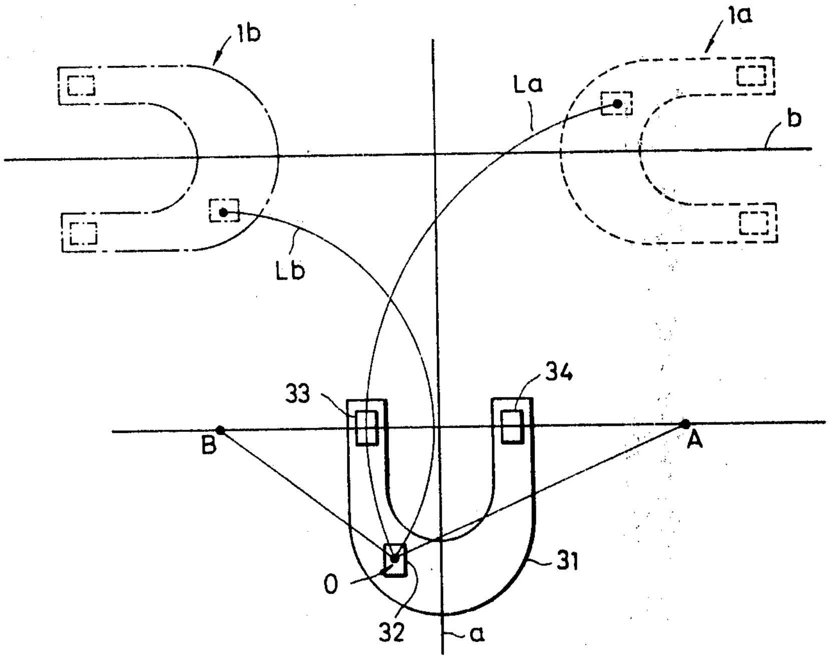
Figure 12:
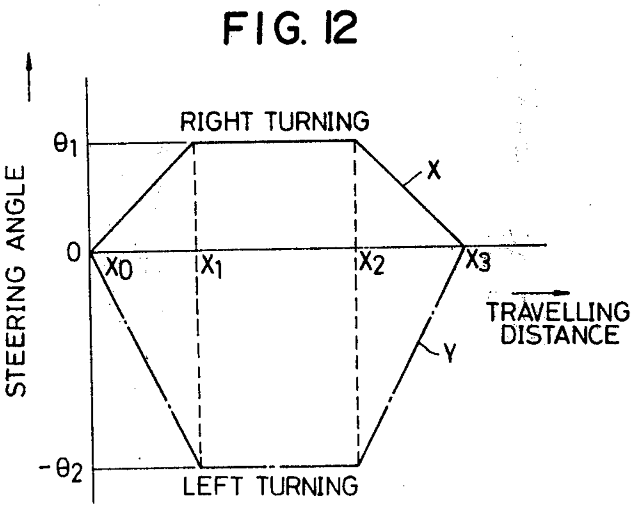
Figure 13:
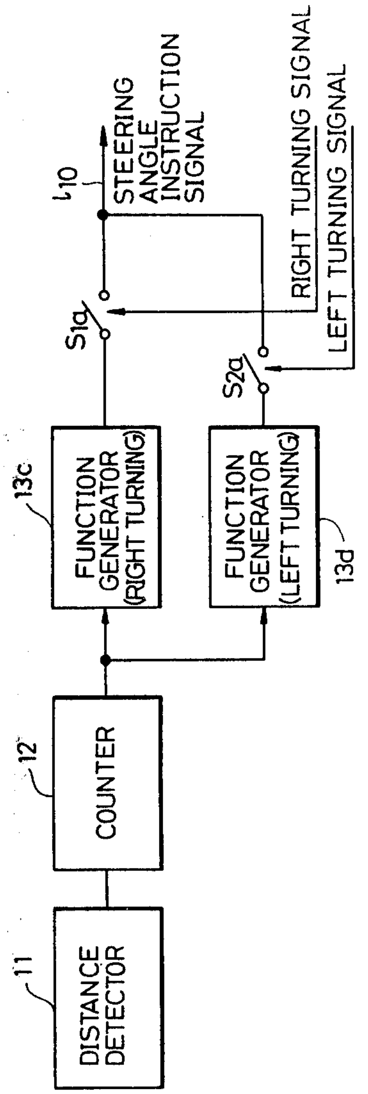
Figure 14:
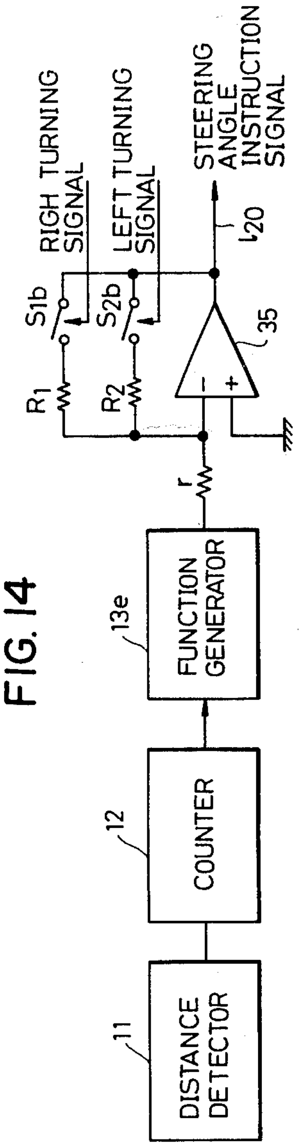
Figure 15:
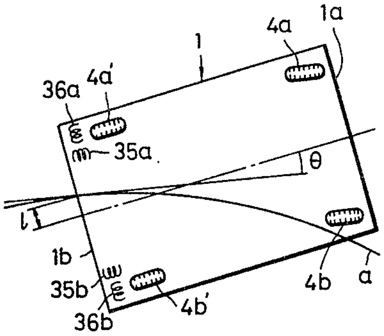
Figure 17:
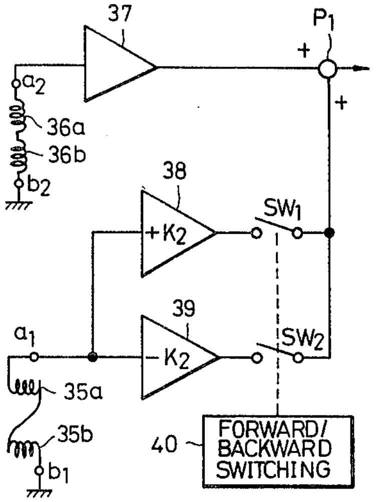
Figure 16:
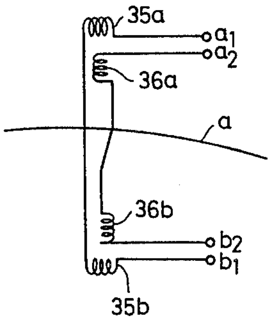
Figure 18:
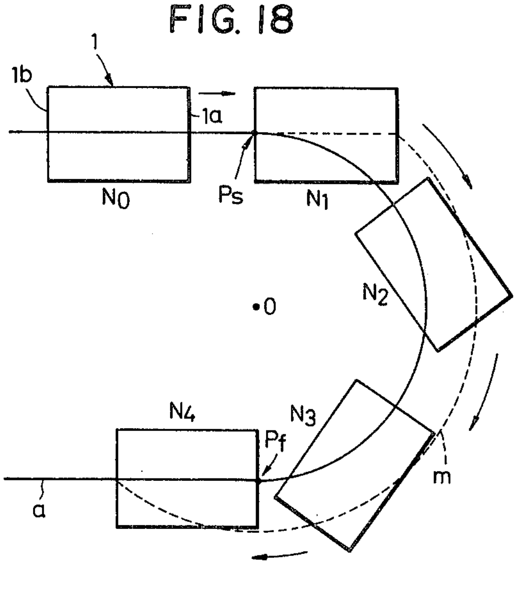
Figure 19:
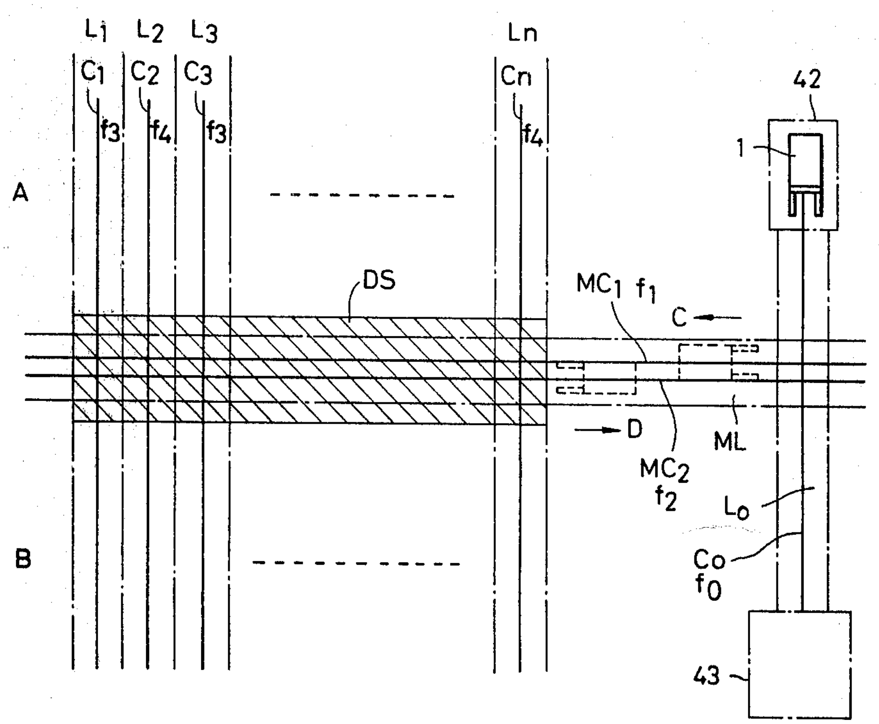
Figure 20:
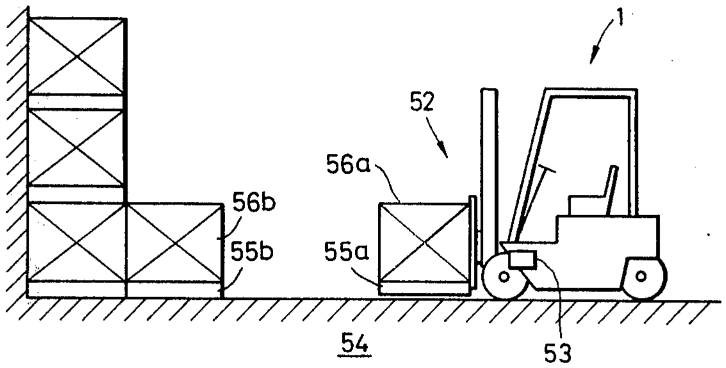

FIGS. *3a* to *3c* are views for explaning operations of posture angle detection coils;

FIG. 4 is a graphical diagram showing trapezoid functions used for the programmed turning according to the invention;

FIG. 5 is a block diagram showing an embodiment of the steering control system according to the invention;

FIG. 6 is a block diagram showing another embodiment in which a part of the embodiment shown in FIG. 5 is modified;

FIG. 7 is a schematic plan view showing forward and reverse turning of the vehicle;

FIG. 8 is a graphical diagram showing trapezoid functions used in the forward and reverse turning of the vehicle;

FIGS. 9 and 10 are block diagram showing examples of constructions for producing the respective functions used in the forward and reverse turning of the vehicle;

FIG. 11 is a schematic plan view showing right and left turning of a fork lift truck;

FIG. 12 is a graphical diagram showing examples of trapezoid functions used for the right and left turning of the fork lift truck shown in FIG. 11;

FIGS. 13 and 14 are block diagrams showing examples of constructions for obtaining the trapezoid functions used for the right and left turning;

FIGS. 15 and 16 are views showing other examples of the posture angle detection coils;

FIG. 17 is a block diagram showing a modified embodiment of the steering control system in which the posture angle detection coil shown in FIG. 16 is used;

FIG. 18 is a plan view showing a state of travelling of the vehicle along a curved portion of a guide cable;

FIG. 19 is a diagram showing a travelling path of an unmanned vehicle between a main guide path and a plurality of lanes crossing at right angles with the main guide path; and FIG. 20 is a side view of an unmanned fork lift truck mounting a load detection device.

Figure 21:
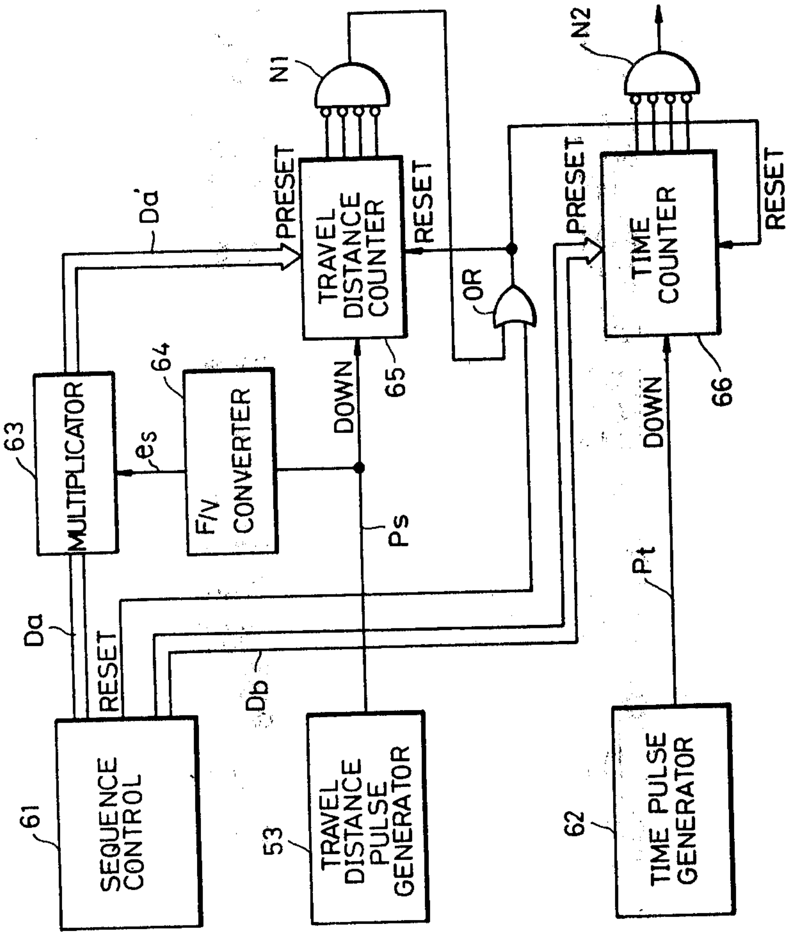

FIG. 21 is a block diagram showing a construction of the load detection device.

DESCRIPTION OF PREFERRED EMBODIMENTS

One embodiment of this invention using the turning program having a turning angle less than the predetermined turning angle will first be described.

Figure 1:
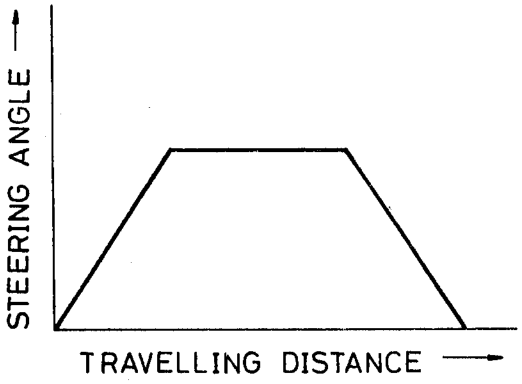
FIG. 1 is a graphical diagram showing a trapezoid function used commonly for a programmed turning of a vehicle.
Figure 2:
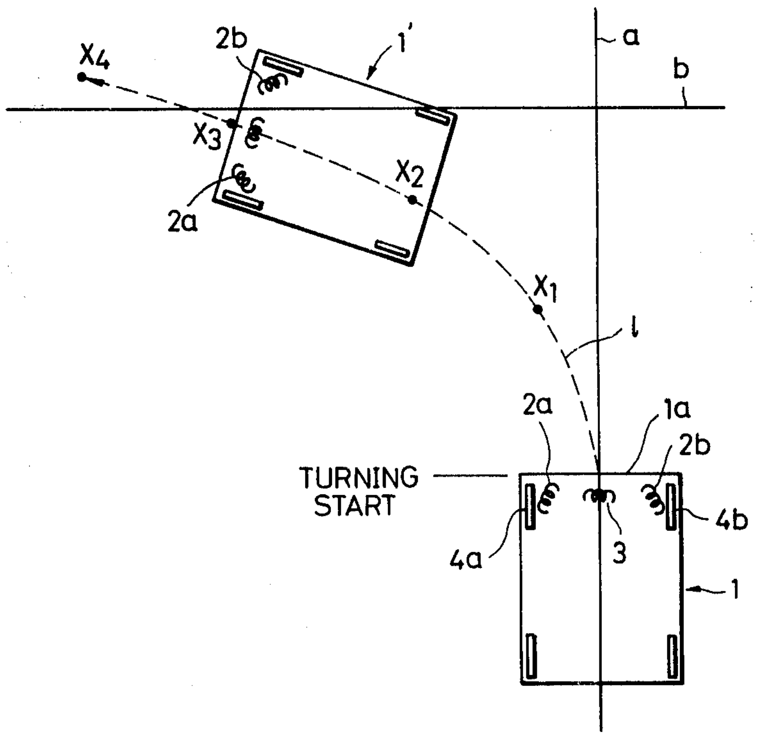
FIG. 2 is a schematic plan view showing a state of travelling of the vehicle turning in accordance with the present invention.

Consider the case where, as shown in FIG. 2, an unmanned vehicle is moved from a guide cable a to a guide cable b at a place where the cables a and b intersect each other at right angles (the predetermined turning angle being 90 degrees).

In FIG. 2, the guide cables a and b are laid along a course along which the unmanned vehicle 1 is guided, with an AC current of a predetermined frequency being applied to the cables.

Posture angle detecting coils 2*a* and 2*b* are provided in the vicinity of left and right wheels 4*a* and 4*b* in the front part 1*a* of the unmanned vehicle 1, respectively. Each of the detecting coils 2*a* and 2*b* is disposed at an angle or in parallel with the center line of the vehicle body, and the coils are connected in series so as to cancel the induced voltages therein as shown in part (a) of FIG. 3. The posture angle detecting coils 2*a* and 2*b* are employed to detect a vehicle posture angle (which the vehicle center line forms with the guide cable a or b) when the vehicle 1 is guided along the guide cable a or b (hereinafter referred to as "a guide travelling period" when applicable). When the vehicle body is on the guide cable a or b in such a manner that it is in parallel with the guide cable a or b (posture angle being zero) as shown in the part (a) of FIG. 3, voltages induced in the detecting coils 2*a* and 2*b* are equal to each other and are therefore cancelled by each other. As a result, no output voltage is provided by the series circuit 2 constituted by the detecting coils 2*a* and 2*b*. However, if the vehicle body forms an angle with the guide cable a or b as shown in the part (b) or (c) of FIG. 3, different voltages are induced in the coils 2*a* and 2*b*, and therefore the difference voltage therebetween (which is a voltage having a phase and a magnitude corresponding to the direction and magnitude of the posture angle) is provided by the series circuit 2. As each of the coils 2*a* and 2*b* is arranged to form an angle with the center line of the vehicle body as was described with reference to FIG. 2, it is possible to detect not only the posture angle but also the sideward displacement of the vehicle with respect to the guide cable a or b. When the vehicle body is displaced sidewardly of the guide cables a (or b), the induced voltage of the coil closer to the guide cable a (or b) becomes higher than that of the other coil, and therefore the difference voltage therebetween is outputted by the series circuit 2. Thus, in the case where the detecting coils 2*a* and 2*b* are arranged as shown in FIG. 2, forming an angle with the vehicle center line, a voltage corresponding to the posture angle and sideward displacement of the vehicle body is provided (the phase corresponding to the direction of posture angle and the direction of sideward displacement, while the amplitude corresponding to the extent of posture angle and the extent of sideward displacement).

Accordingly, if steering control is made so that the output voltage of the series circuit 2 is zero during the guide travelling then it is possible to run the vehicle 1 along the guide cable a or b.

Figures 3A, 3B, 3C:
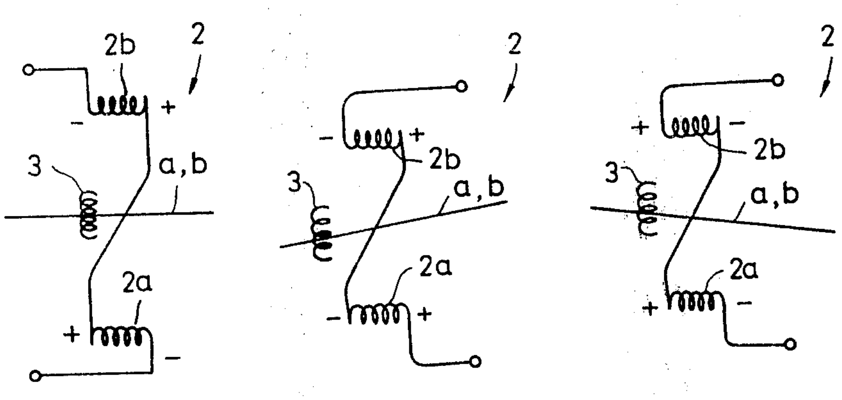

In FIGS. 2 and 3, reference character 3 designates a reference phase detecting coil which is disposed on the vehicle center line in such a manner that it forms right angle with the vehicle center line. The detecting coil 3 operates to detect the phase of the AC current applied to the guide cable a or b. The phase of a voltage induced in the reference phase detecting coil 3 is maintained unchanged irrespective of the direction of posture angle and the direction of sideward displacement.

In this embodiment, the vehicle 1 is turned from the guide cable a to the guide cable b by the use of a turning program of a trapezoid function as indicated by the solid line in FIG. 4. This turning program indicates a steering angle corresponding to a travelling distance from the turning start point. More specifically, first the vehicle is moved to a distance point X1 by being steered gradually, and thereafter it is moved to a distance point X2 with the steering angle being maintaining unchanged. Then, the vehicle is moved from the distance point X2 to a distance point X3 with the steering angle being restored gradually to zero at the distance point X3. With the turning program indicated by the solid line in FIG. 4, the vehicle 1 is moved along a line l in FIG. 2. In other words, when the vehicle is turned in accordance with a turning program having the predetermined turning angle (as indicated by the dotted line in FIG. 4), the posture angle with respect to the guide cable b becomes zero at the time instant when the steering angle is restored to zero; however, in the case where a turning program whose turning angle is smaller (for instance, 70°-80°) than the predetermined turning angle, as indicated by the solid line in FIG. 4, the vehicle cannot be shifted onto the cable b in such a manner that it is in parallel with the cable b at the time instant when the steering angle is restored to zero (or at the distance point X3). When the vehicle reaches the distance point X3, it is moved straightly for a suitable distance (or to the distance point X4) by crossing the guide cable b obliquely with the steering angle maintained at 0°.

In this invention, when the vehicle 1 is shifted to the guide cable while it is straightly moved from the distance point X3 to the distance point X4, the turning program operation is switched over to the guide travelling operation using the guide cable b, so that the vehicle is smoothly moved to go along the guide cable b. The switching operation will be described later.

A control system for realizing the above-described vehicle turning method will be described with reference to FIG. 5.

Referring to FIG. 5, the detection signals of the posture angle detecting coils 2*a* and 2*b* are applied through a band-pass filter 6 to an analog switch 9. The detection signal of the reference phase detecting coil 3 is applied through a band-pass filter 7 to a comparator 8, which only when the detection signal applied thereto is positive, outputs a voltage to turn on the analog switch 9. As was described before, the phase of the output signal of the series circuit 2 comprising the posture angle detecting coils 2*a* and 2*b* is inverted in response to the posture angle and sideward displacement, and the phase of the output signal of the reference phase detecting coil 3 is maintained constant irrespective of the direction of posture angle. Therefore, the analog switch 9 outputs a detection signal having the polarity and amplitude which correspond to the directions and extents of the posture angle and sideward displacement of the vehicle. The detection signal outputted by the analog switch 9 is applied to a smoothing circuit 22 where it is smoothed, and it is applied, as a steering instruction signal S1 for instructing the direction of steering and the amount of steering in a steering mechanism 17 in the guide travelling period, to a contact 10*a* of a switch 10.

A distance detector 11 produces pulses in proportion to the travelling distance of the vehicle 1. The pulses are counted by a counter 12 after the turning operation is started, and the count value of the counter 12 is applied to a function generator 13. The function generator 13 operates to obtain a steering instruction value corresponding to this count value in accordance with the turning program indicated by the solid line in FIG. 4, and to apply a signal corresponding to the instruction value, as a steering instruction signal S2 in the turning travelling period, to a contact 10*b* of the switch 10.

The switch 10 operates to select one of the steering instruction signal S1 for guide travelling applied to the contact 10*a* and the steering instruction signal S2 for program turning applied to the contact 10*b* and to apply it to an addition point 14. A steering angle detector 18 operates to detect an actual steering angle to provide a detection signal which is applied to the addition point 14. The addition point 14 applies the difference value between the steering instruction value and the steering instruction value through an amplifier 15 to an actuator 16 to operate the steering mechanism 17 so that the difference value becomes zero.

The switching operation of the switch 10 will be described. The switch 10 is operated by an instruction signal from a control circuit 21. In the guide travelling period, the control circuit 21 causes the armature of the switch 10 to trip over to the contact 10*a* so that the steering instruction signal S1 from the posture angle detecting coils 2*a* and 2*b* is applied to the addition point 14 to guide the vehicle 1. Upon application of the turning instruction signal, the armature of the switch 10 is tripped over to the contact 10*b*, whereupon the counter 12 starts its counting operation, and the function generator 13 generates the steering instruction signal S2 in accordance with the turning program indicated by the solid line in FIG. 4, the signal S2 being applied to the addition point 14. The vehicle 1 carries out the program turning operation in accordance with this steering instruction signal S2. With the program turning operation carried out, the guide travelling operation is effected if the following conditions are satisfied. One of the conditions is that (1) the signal S1 from the posture angle detecting coils 2*a* and 2*b* is in the range of a predetermined low value ±V*a*. That is, while the vehicle is moved from the distance point X3 to the distance point X4, the posture angle is not change at all because the steering angle is maintained at 0°; but since the distance between the guide cable b and the vehicle 1 is changed, the signal S1 is changed according to that distance. More specifically, initially the coil 2*b* approaches the guide cable b and the voltage induced in the coil 2*b* is higher than the voltage induced in the coil 2*a*, as a result of which the signal S1 has the polarity corresponding to the coil 2*b*. As the vehicle is further moved, the voltage induced in the coil 2*a* is increased, so that the signal S1 approaches zero. At the vehicle is further moved, the voltage induced in the coil 2*a* becomes higher than the voltage induced in the coil 2*b*, and accordingly the signal S1 has the polarity corresponding to the coil 2*a*. Thus, if the value of the signal S1 is close to zero, it can be determined that the vehicle 1 is substantially on the cable b.

In this embodiment, the signal S1 is applied to a window comparator 20. When the signal S1 is within the range of the predetermined small value ±V*s* in the window comparator 20, it is determined that the vehicle 1 is substantially on the cable b, and the window comparator applies a signal to the control circuit 21 as one condition to trip the armature of the switch 10 over to the contact 10*a*. A switch 26 is provided on the input side of the window comparator 20. This switch 26 is to operate the window comparator 20 only when the vehicle 1 is straightly moved to cross the guide cable b, and it is operated (on and off) by a signal from a comparator 27. The comparator 27 receives the count value of the counter 12, and (2) turns on the switch 26 to supply the signal S1 to the window comparator 20 when the count value of the counter 12 corresponds to farther than the distance point X3. The signal from the reference phase detecting coil 3 is also employed as one condition to trip the armature of the switch 10 to the contact 10*a*. As the vehicle 1 is moved away from the guide cable b, the value of this signal is decreased; and as it approaches the guide cable, the value of the signal is increased. Therefore, (3) if the value is smaller that a preset value, it is determined that the vehicle 1 is out of the cable a or b, and tripping the armature of the switch 10 over to the contact 10*a* is not carried out. More specifically, the signal from the reference phase detecting coil 3 is applied through the band-pass filter 7, a rectifier 23 and a smoothing circuit 24 to a comparator 25. When the value of the signal applied to the comparator 25 is smaller than the preset value, it is determined that the vehicle is out of the cable b. As a result, a courseout signal is applied from the comparator 25 to the control circuit 21 to inhibit the switching of the switch 10.

Thus, under the three conditions that the vehicle 1 is moved farther than the distance point X3, the signal S3 from the posture angle detecting coils 2*a* and 2*b* is within the range of ±V*s* and no course-out signal is outputted, the control circuit 21 determines that the vehicle is substantially on the guide cable b and causes the armature of the switch 10 to trip over to the contact 10*a* thereby to carry out the guide travelling operation by the guide cable b.

One example of the case where a turning program having a predetermined turning angle is employed will be described with reference to FIG. 6, in which some components similar to those in FIG. 5 are omitted for simplification, and those components which have been previously described with reference to FIG. 5 have therefore been similarly numbered.

The turning program employed in the example shown in FIG. 6 is as indicated by the dotted line in FIG. 4. More specifically, the turning program is such that when the steering angle is restored to 0°, the vehicle is on the guide cable b in such a manner that it is in parallel with the cable b. In this example, when the vehicle is brought to be substantially on the guide cable b during the program turning operation, the program turning operation is replaced by the guide travelling operation. Even if the turning program having the predetermined turning angle is employed, it is not always possible to bring the vehicle to be on the guide cable b and in parallel therewith when the travelling is completed because of some reasons (the vehicle is turned at a considerably low speed, the posture angle with the guide cable a is not zero, when the turning is started). Under such condition, if the program turning operation is switched to the guide travelling operation, the vehicle may be moved in zigzag state. Therefore, when it is detected that the vehicle is brought to be substantially on the guide cable b even before the program turning operation is completed. The program turning operation is switched over to the guide turning operation according to the invention.

In this example, the magnitude of the difference between the steering instruction signal S1 from the posture angle detecting coils 2*a* and 2*b* and a steering instruction signal S2′ from a function generator 13′ is employed as one condition to switch the program turning operation to the guide travelling operation. As shown in FIG. 6, a subtractor 29 receives the steering instruction signal S2′ from the function generator 13′ through a switch 28 and the steering instruction signal S1 through a switch 26 operated in associated with the switch 28 to provide the difference between the two signals S2′ and S1. This difference is applied to the window comparator 20. If the value of this difference is within the predetermined range ±V*s*, a signal is applied from the window comparator 20 to the control circuit 21. When the vehicle is sufficiently remote from the guide cable b, the value of the signal S2′ is great while the value of signal S1 is approximately zero. Therefore, the difference between the two signals is great, and no output signal is provided by the wind comparator 20. However, as the turning operation reaches its end, the difference between the signals S2′ and S1 is decreased to be within the range of ±Vs and the signal is outputted by the comparator 20. When, under the conditions that the signal is outputted by the comparator 20 and no course-out signal is outputted, the vehicle has been moved for farther than the predetermined distance point after the start of the turning operation, the control circuit 21 causes the armature of the switch 10 to trip over to the contact 10*a* to carry out the guide travelling operation. Thus, the program turning operation is switched over to the guide travelling operation when the vehicle almost completes its turning operation or the signal S1 is substantially equal to the signal S2′. Accordingly, the steering instruction signal is not suddenly changed, that is, the program turning operation can be smoothly switched to the guide travelling operation.

The term "predetermined distance" mentioned above is intended to mean a value set by the comparator 27′, which is the distance point (X2′ in FIG. 4) where restoring the steering mechanism 17 is started.

One modification of this invention will be described with reference to FIGS. 7 to 10. In the above description, the vehicle 1 is moved forward and turned from the guide cable a to the guide cable b. If the same unmanned vehicle is moved backward and turned from the guide cable b to the guide cable a, with the same function as that in the above-described case, when the turning operation is ended, the vehicle has an angle with respect to the guide cable a as indicated by the broken line in FIG. 7; that is, the position of the vehicle 1 is not coincident with the initial position. That drawback is eliminated by the modification of the invention in which different functions are employed for the forward turning and the backward turning, respectively.

Described below is the case where the vehicle 1 at the position A on the guide cable a is shifted to the position B on the guide cable b in accordance with a forward-going program turning and is then moved back to the position A in accordance with a backward-going program turning.

In the forward-going program turning operation, a steering angle $\theta$ is controlled according to a function as indicated by the dotted line I in FIG. 8. That is, the vehicle is moved from the position A by being steered at a certain rate. When the vehicle reaches the distance point $1_1$, the steering angle $\theta_2$ at that time is maintained until the vehicle travels to the distance point $1_2$. Then, while the steering angle is decreased at a certain rate, the vehicle is moved to the distance point $1_3$, so that the vehicle on the cable b and in parallel therewith at the position B.

In the backward-going turning operation from the position B to the position A, the steering angle $\theta$ is controlled according to a function II as indicated by the solid line in FIG. 8. The steering angle is abruptly changed to $\theta_1$ at the position B. Thereafter, the steering angle is controlled in accordance with a function obtained by shifting the trapezoid function (I in FIG. 8) employed in the forward-going turning operation left along the distance axis (or the horizontal axis in FIG. 8). In this case, the steering delay caused during the backward-going turning operation can be compensated and the unmanned vehicle 1 can be brought to be on the guide cable a and in parallel therewith at the position A.

One example of a control device employed for this modification is as shown in FIG. 9.

In FIG. 9, a distance detector 11 and a counter 12 are similar to those in FIG. 2.

A trapezoid function as indicated by the dotted line I in FIG. 8 is programmed in a function generator 13*a* for forward-going turning. The function generator 13*a* outputs a signal representative of a steering angle in response to a position signal from the counter 12.

A function as indicated by the solid line II in FIG. 8 is programmed in a function generator 13*b* for backward-going turning. The function generator 13*b* outputs a signal representative of a steering angle in response to a position signal from the counter 12.

Switches S1 and S2 are to select steering angle instruction signals in response to the forward-going and backward-going operations of the vehicle 1. In the forward-going turning operation, the switch S1 is turned on to permit a signal from the function generator 13*a* to be applied to a line L. In the backward-going turning operation, the switch S2 is turned on to apply a signal from the function generator 13*b* to the line L.

The steering angle is controlled according to the signal introduced to the line L.

The invention has been described with reference to the case where the front wheels are steering wheels. Therefore, the program function in the backward-going turning operation is obtained by advancing the program function in the forward-going turning operation (or shifting it left along the distance axis). However, in the case where the rear wheels are employed as the steering wheels as in the case of, for instance, fork lift trucks, the program function in the backward-going turning operation is obtained by delaying the program function in the forward-going turning operation (or shifting it right along the distance axis).

In the example shown in FIG. 9, two function generators are provided for the forward-going and backward-going operations, respectively. However, in practice, the same object can be achieved by only one function generator. For instance, as shown in FIG. 10, one function generator 13′ programmed with automatic turning is provided to store a trapexoid function such as indicated by the dotted line I in FIG. 8 which is employed as the function in the forward-going turning operation. In the forward-going operation, upon application of a forward-going turning signal, the function generator 13′ outputs a steering instruction signal according to the count value of the counter 12 at the initial distance point $1_0$ (FIG. 8). For the backward-going turning operation, a function such as indicated by the solid line II in FIG. 8 is required. However, since this function is obtained by advancing the function indicated by II in FIG. 8 by a predetermined distance $1_S$ (FIG. 8) (or shifting it in the negative direction along the distance axis), the function generator 13′ having stored this function I can be commonly used. That is, in the backward-going operation, a backward-going turning signal is applied to the function generator 13′ so as to read the function as indicated by the solid line II in FIG. 8. This can be achieved by reading a function value at an address corresponding to the predetermined distance $1_S$ instead of reading a function value at an address corresponding to the initial distance $1_0$.

When an unmanned vehicle which is an ordinary four-wheel vehicle (two wheels being the steering wheels) is turned right or left, the same function can be employed both in right turning and in left turning (although the steering angles are different in polarity). However, if the same function is employed in both right turning and left turning a vehicle such as a reach fork lift truck which has only one steering wheel off the center line, it is impossible to shift the vehicle onto a guide cable in one of the right and left turning operations, because the turning radius in the right turning operation is different from that in the left turning operation.

Shown in FIGS. 11 through 14 is another modification of this invention in which a vehicle of this type is so designed as to satisfactorily turn both right and left.

Referring to FIG. 11, an unmanned vehicle 31 is provided with fixed wheels 33 and 34 on the right and left sides of the front part thereof and a steering wheel 32 on the left side of the rear part thereof.

In the case where, as shown in FIG. 11, the vehicle 31 on a line a is turned right around the point A so that it is brought to be at a position (indicated by the dotted line 1*a*) on a line b, the locus of the steering wheel 32 is as indicated by a line L*a*. On the other hand, in the case where the vehicle 1 is turned left around the point B of symmetry of the point A with respect to the line a so that it is brought to be at a position (indicated by the one-dot chain line 1*b*) on the line b, the locus of the steering wheel 2 is as indicated by a line L*b*. The lines L*a* and L*b* are different from each other in curve dimension because the steering wheel 32 is disposed off the center line of the vehicle body. The locus L*a* in right turning is an arc described with the point A as the center and with the distance between the point A and the center O of the steering wheel 32 as the radius. The locus L*b* in left turning is an arc described with the point B as the center and with the distance between the point B and the center O as the radius. Accordingly, in order to satisfactorily shift the vehicle 31 onto the line b from the line a, in both of the right and left turning operations, it is necessary not only to reverse the steering direction but also to control the steering angle in accordance with the locus described by the steering wheel 32.

One example of the relation between steering angle and travelling distance in the right and left turning operations is shown in FIG. 12 in which the solid line X is for the right turning operation and the one-dot chain line Y is for the left turning operation.

First, the right turning operation will be described. The vehicle 31 is at a distance point $X_0$ at which the turning operation is started. The vehicle is so controlled that it is steered right gradually while being moved until the steering angle reaches $\theta_1$ at a distance point $X_1$. After the steering angle has $\theta_1$ at the distance point $X_1$, the vehicle is moved to a distance point $X_2$ with the steering angle $\theta_1$ being maintained. After the vehicle has reached the distance point $X_2$, the steering direction is gradually reversed (or changed to the left). When the steering angle becomes zero at a distance point $X_3$ the vehicle reaches the position indicated by the dotted line 1*a* on the line b (FIG. 11). In this manner, the steering angle is controlled.

In the left turning operation, the vehicle is so controlled that when the vehicle is moved to the distance point $X_1$ while being gradually steered left, the steering angle is $-\theta_2$. After the steering angle has $-\theta_2$ at the distance point $X_1$, the vehicle is moved to the distance point $X_2$ with the steering angle $-\theta_2$ being maintained. After the vehicle has reached the distance point $X_2$, the steering direction is gradually reversed (or changed to the right). When the steering angle becomes zero at the distance point $X_3$, the vehicle reaches the position indicated by the one-dot chain line 1*b* on the line b. In this way, the steering angle is controlled.

In FIG. 12, the values of the distance points $X_0$ through $X_3$, and the steering angles $\theta_1$ and $-\theta_2$ are predetermined in accordance with the position of the steering wheel 32 in the vehicle or the like.

FIG. 13 shows one example of a control system for carrying out the steering control described with reference to FIG. 12.

Referring to FIG. 13, a distance detector 11 and a counter 12 operates in combination to detect a travelling distance as measured by the center line of the vehicle body. Accordingly, the detector 11 is mounted on the center line of the vehicle body. If it is difficult to mount the detector 11 on the center line of the vehicle body, two detectors 11 may be provided on the right and left fixed wheels 33 and 34, respectively, to obtain the wheel travelling distances so that the average value of these travelling distance is employed as the vehicle travelling distance. A function is indicated by the solid line X in FIG. 12 is programmed in a right turning function generator 13*c*, which outputs a signal instructing a steering angle in response to distance information from the counter 12. Similarly, a function is indicated by the one-dot chain line Y in FIG. 12 is programmed in a left turning function generator 13*d*, which outputs a signal instructing a steering angle in response to distance information from the counter 12.

Switches S1*a* and S2*a* are to select a steering angle instruction signal separately according to the turning direction. In the right turning, only the switch S1*a* is closed by a right turning signal to apply the steering angle instruction signal from the right turning function generator 13*c* to a line $l_{10}$. On the other hand, in the left turning, only the switch S2*a* is closed by a left turning signal to apply the steering angle instruction signal from left turning function generator 13*d* to the line $l_{10}$. A steering mechanism (not shown) is operated so that the steering angle is controlled by the signal thus applied to the line $l_{10}$.

In the example shown in FIG. 13, two function generators are provided for the right and left turning operations, respectively. However, the two function generators may be replaced by one function generator to achieve the same object.

FIG. 14 illustrates one example of the steering control system in which only one function generator is employed for both the right and left turning operations.

A trapezoid function as indicated by the solid line X (or the one-dot chain line Y) in FIG. 12 is programmed in a function generator 13, which outputs a signal according to distance information from a counter 12. This output signal is applied through a resistor r to an amplifier 35. When a switch S1*b* is closed by a right turning signal, the gain of the amplifier 35 is decreased, and the steering angle indicated by the signal introduced to a line $l_{20}$ is as indicated by the solid line X in FIG. 12. Similarly, when a switch S2*b* is closed by a left turning signal, the gain of the amplifier 35 is increased, and the steering angle indicated by the signal introduced to the line $l_{20}$ is as indicated by the one-dot chain line Y in FIG. 12. A steering mechanism (not shown) is operated so that the steering angle is controlled by the signal applied to the line $l_{20}$.

The invention has been described with reference to the posture angle detector which detects a posture angle with one pair of detecting coils.

Now, the invention will be described with reference to one modification thereof in which two pairs of detecting coils are employed.

Referring to FIG. 15, course-out detecting coils 36*a* and 36*b* and posture angle detecting coils 35*a* and 35*b* are provided in the vicinities of the rear wheels (or front wheels) of an unmanned vehicle 1, respectively. Each of the course-out detecting coils 36*a* and 36*b* is disposed perpendicularly to the center line of the vehicle body so that the detection direction is perpendicular to a guide cable a. Accordingly, voltages are induced in the detecting coils 36*a* and 36*b* at all times, respectively, but they are connected as shown in FIG. 16 so that the induced voltages are cancelled by each other (opposite-phase series connection). When the guide cable a is at the center of the distance between the two coils 36*a* and 36*b*, no voltage is provided across the output terminals $a_2$ and $b_2$, but as the guide cable leaves the center, the voltage across the output terminals is increased. The phase of the output voltage is coincident with the voltage induced in the detecting coil closer to the guide cable a. Therefore, the direction and magnitude of displacement (indicated by l in FIG. 15) of the vehicle body rear part 1*b* can be detected from the phase and magnitude of the vehicle developed across the output terminals $a_2$ and $b_2$.

The posture angle detecting coils 35*a* and 35*b* are provided in parallel with the vehicle body so that the detection directions are in parallel with the guide cable a. the detecting coils 35*a* and 35*b* are connected so that a voltage developed across the output terminals $a_1$ and $b_1$ is the sum of voltages induced in the coils 35*a* and 35*b* (coincident-phase series connection). Accordingly, when the tangential line of the guide cable a at the vehicle body rear part 1*b* is in parallel with axes of the coils 35*a* and 35*b*, no voltage is induced in the coils 35*a* and 35*b*. As this parallel state is established, the voltages induced in the coils are increased. The phase of the voltage is changed according to the direction of the posture angle of the vehicle body. Therefore, the direction and magnitude of an angle $\theta$ (hereinafter referred to as "a posture angle" when applicable) which the tangential line of the guide cable a at the vehicle body rear part 1*b* forms with the center line of the vehicle body can be detected from the phase and magnitude of the voltage developed across the output terminals $a_1$ and $b_1$.

As shown in FIG. 17, the output voltage of the course-out detecting coils 36*a* and 36*b* is applied through an amplifier 37 to an addition point P1, and the output voltage of the posture angle detecting coils 35*a* and 35*b* is applied to an amplifier 38 having a gain of $+K_2$ and to an amplifier 39 having a gain of $-K_2$. The output voltages of the amplifiers 38 and 39 are equal is magnitude but opposite in phase (out of phase by 180°), and the former is employed for posture angle control in the forward-going operation, while the latter is employed for posture angle control in the backward-going operation. The signals opposite in phase are employed in the forward-going operation and the backward-going operation, respectively, because even if the vehicle body posture angles are equal, it is necessary to reverse the steering direction separately according to the forward-going and backward-going operations.

The output voltages of the amplifiers 38 and 39 are applied to switches $SW_1$ and $SW_2$, respectively. The switches $SW_1$ and $SW_2$ are turned on and off by a signal from a forward-going and backward-going switching device 40. For instance, in the forward-going operation, the switch SW $SW_1$ is closed, as a result of which a signal for forward-going turning is applied from the amplifier 38 to the addition point P1; and in the backward-going operation, the switch $SW_2$ is closed on, as a result of which a signal for backward-going turning is applied from the amplifier 39 to the addition point P1.

In the addition point P1, the course-out detection signal from the amplifier 37 is added to the posture angle detection signal from the amplifier 38 or 39. The resulting addition output corresponds to the steering angle which is required for correcting the displacement from the course of the vehicle 1 and the posture angle thereof. That is, the phase of the addition output is representative of the composition (or the steering direction) of the direction of the posture angle and the direction of the displacement from the course; and the level of the addition output is representative of the composition (or the amount of steering) of the magnitude of the posture angle and the amount of the displacement from the course.

The case where the unmanned vehicle 1 shown in FIG. 15 is run along a sharp curve will be described with reference to FIG. 18.

In FIG. 18, a guide cable a is laid in the form of an arc with the center O extended from the position P*s* to the position P*f*, and the other portions thereof are extended straightly from the position P*s* and P*f*. An unmanned vehicle 1 is run from the position $N_0$ to the position $N_4$.

First, the vehicle 1 at the position $N_0$ is run towards the curve starting position P*s*. Even if the vehicle front part 1*a* reaches the position P*s*, the vehicle 1 is run straightly because the aforementioned posture angle detecting coils 35*a* and 35*b* course-out detecting coils 36*a* and 36*b* are provided in the rear part 1*b* of the vehicle body. The dotted line m designates the locus of the center of the vehicle front part 1*a*.

When the rear part 1*b* of the vehicle 1 reaches the position P*s*, the vehicle starts steering and runs towards the curve finishing position P*f*. In this curve, the vehicle 1 is run in such a manner that the center of the vehicle rear part 1*b* goes along the guide cable a with the aid of the pick-up coils 36*a* and 36*b*. Furthermore, the vehicle 1 is run with the aid of the pick-up coils 35*a* and 35*b* in such a manner that the axes of the pick-up coils 35*a* and 35*b* are in parallel with the tangential line of the guide cable a at the vehicle rear part 1*b*, that is, the rear part 1*b* of the vehicle body is perpendicular to the guide cable a (cf. the positions $N_2$ and $N_3$).

Therefore, the locus m of the center of the vehicle front part 1*a* forms an arc whose radius is larger than the radius of the curve of the guide cable a. When the vehicle front part 1*a* goes ahead of the curve finishing position P*f*, the vehicle rear part 1*b* is still over the curve, and therefore the vehicle is run being maintained steered. When the rear part 1*b* reaches the curve finishing position P*f*, the steering is restored, and the vehicle is run straightly along the guide cable a.

In the case where the vehicle is moved backwardly along the same path, the locus of the vehicle is the same as that described by the vehicle moving forwardly as described above. That is, similarly as in the above-described forward-going operation, the vehicle 1 is run with the aid of pick-up coils 36*a* and 36*b* and 35*a* and 35*b* in such a manner that the center position of the rear part 1*b* is perpendicular to the guide cable a at all times.

FIG. 19 shows another embodiment of the invention in which the above described turning is applied to steering of an unmanned mobile vehicles between a main guidance path and a plurality of lanes crossing at right angles with the main guidance path.

According to the illustrated embodiment, by turning by 90 degrees in a reverse moving of the vehicle, the posture of the vehicle is brought in coincidence with the direction of the lane and the position of te vehicle is brought approximately in alignment with the center of the lane and thereafter an exact alignment of the vehicle with the lane is established by forwardly moving the vehicle.

Referring to FIG. 19, a plurality of lanes $L_0$ through $L_n$ crossing at right angles with a main guidance path ML are provided. The lane $L_0$ is provided with a vehicle standby station 42 and a load loading and unloading table 43. Two guide cables $MC_1$ and $MC_2$ spaced suitably from each other are provided in the main guidance path ML. There are also provided leader cables $C_0$ through $C_n$ in the center of each of the lanes $L_0$ through $L_n$. Low frequency guide signals of frequencies $f_0$, $f_1$ and $f_2$ are applied respectively to an associated one of the guide cables $C_0$, $MC_1$ and $MC_2$. Low frequency guide signals of frequencies $f_3$ and $f_4$ are applied alternately to the leader cables $C_1$ through $C_n$. One side of the lanes $L_1$ through $L_n$ in relation to the main guidance path is termed an "A side" lane and the other side thereof a "B side" lane. The lanes $L_1$ through $L_n$ are provided for placing load thereon.

Assume now that the unmanned vehicle 1 travels from the standby station 42 to the loading and unloading table 43, load a cargo therefrom and unload it on the A side lane $L_2$ and returns to standby station 42. The vehicle 1 proceeds forwardly from the standby 42 to the table 43 with the frequency $f_0$ applied to the guide cable $C_0$ being used as the guide signal. After loading goods from the table 43 the vehicle 1 moves reversely along the cable $C_0$. Upon detection of the frequency signal $f_2$ of the cable $MC_2$ for the main guidance path ML, the vehicle decelerates its speed. Then upon detecting the frequency signal $f_1$ of the cable $MC_1$, the vehicle 1 turns by 90 degrees reversely in accordance with a preset programmed function and subsequently moves reversely in the direction of the lane $L_2$ (i.e. arrow C) along the main guidance path ML guided by the guide cable $MC_1$. In other words, the vehicle 1 is moved reversely along the cable $MC_1$ which is nearer to the A side lane if it is desired to cause the vehicle 1 to proceed to the A side lane. If it is desired to cause the vehicle 1 to proceed to the B side lane, the vehicle 1 is moved along the leader cable $MC_2$ of the main guidance path ML which is nearer to the B side lane. The value of the function in the programmed turning of the vehicle 1 is so selected that a center line of the vehicle 1 is substantially in alignment with the leader cable after the 90 degree reverse turning of the vehicle 1.

During travelling of the vehicle 1 along the main guidance path ML, the vehicle 1 sequentially detects the signals $f_3$, $f_4$, $f_3$, etc, being applied to the lanes $L_n$, $L_{n-1}$, $L_{n-2}$ etc. which the vehicle 1 passes and counts these signals. In accordance with the count of the signals, the vehicle 1 detects the signal $f_3$ of the lane $L_3$ which is located immediately before the lane $L_2$ into which the vehicle is programmed to be guided and thereupon decrease the vehicle speed. The vehicle 1 subsequently detects the signal $f_4$ of the lane $L_2$ and thereupon is turned by 90 degrees reversely in accordance with the preset programmed function and stops at a position immediately before entering the B side lane $L_2$ after running some distance. In this state, the posture of the vehicle 1 is already in substantial alignment with the direction of the lane $L_2$. In other words, the center line of the vehicle 1 approximately coincides with the cable $C_2$. Accordingly, the vehicle 1 in this state assumes a posture according to which the load placed in the lane $L_2$ can be detected radily and accurately.

Nextly, the vehicle 1 proceeds forwardly using the signal $f_4$ of the lane $L_2$ as the guide signal while effecting an accurate aligning of the vehicle body with the lane $L_2$. The vehicle 1 therefore can proceed to the lane $L_2$ accurately and unload the goods at a predetermined position in the lane $L_2$.

After finishing unloading of the goods, the vehicle 1 moves reversely toward the main guidance path ML and, upon detection of the signal $f_1$ of the cable $MC_1$, the vehicle 1 decreases the vehicle speed. As the vehicle 1 has detected the signal $f_2$ of the cable $MC_2$, the vehicle 1 is turned by 90 degrees reversely in accordance with the programmed function and subsequently is moved reversely along the main guidance path ML in the direction of the lane $L_0$ (i.e. arrow D) being guided by the signal $f_2$ of the cable $MC_2$. Upone detection of the signal $f_0$ of the cable $C_o$, the vehicle 1 is turned by 90 degrees reversely in accordance with the programmed function and thereafter is moved reversely along the lane $L_0$ to the standby station 2 being guided by the signal $f_0$. The loading and unloading operation by the vehicle 1 is completed in the foregoing manner.

In a case where it is desired to guide the vehicle 1 to the B side lane, the vehicle 1 is moved reversely to a predetermined lane along the cable $MC_2$ of the main guidance path ML, then is moved forwardly into the desired lane in the same manner as has previously been described and, after finishing the unloading operation, is moved reversely along the cable $MC_1$ of the main guidance path ML in the direction of the lane $L_0$.

According to this embodiment, since the vehicle posture is in substantial alignment with the direction of the lane in a state in which the vehicle is displayed forwardly after turning, detection of load which is placed in front of the vehicle 1 in the lane can be effected radily and accurately and, besides, the dead space can be reduced to a maximum possible extent. Despite the fact that the present embodiment employs a two side lane type layout, the dead space can be made smaller than the one available in the conventional one side lane type layout. Accordingly, a larger space for load can be obtained in the lane whereby the most efficient utilization of the store can be achieved.

FIG. 20 shows an example of construction by which a unmanned vehicle such as a fork lift truck detects load placed in a lane.

In FIG. 20, a fork lift truck 1 is provided with a pulse generator 53. This pulse generator 53 generates one shot of pulse signal $P_s$ every preset travel distance, e.g. 10 cm, of the vehicle. The travel distance of the vehicle can therefore be measured by counting the number of the generated pulses Ps. The period of the pulse signal Ps varies with the vehicle speed. The pulse signal Ps is applied as a down pulse signal to a travel distance pulse counter 65 of a load detection unit 60 shown in FIG. 21.

A time pulse generator 62 generates a pulse signal $Pt$ every constant time t and supplies this pulse as a down pulse signal to a time counter 66.

On the other hand, as shown in FIG. 20, the unmanned fork lift truck 1 proceeds forwardly along a preset travel path at a certain vehicle speed, maintaining a lift position of the fork 52 nearly at a ground level, that is, a position wherein a pallet 55*a* carrying load 56*a* is not dragged on the ground and yet can come into an abutting engagement with an opposite pallet 55*b* placed on the ground. In this stage, the travel distance counter 65 and the time counter 66 do not perform their counting operation through they receive the pulses P*s* and P*t* from the travel distance pulse generator 53 and the time pulse generator 62.

Upon entering the fork lift truck into a predetermined lane 54, a sequence control circuit 61 outputs preset data D*a*, D*b*. The data D*a* is applied to a multiplicator 63. This multiplicator 63 multiplies the data D*a* by a suitable coefficient K in accordance with the running speed of the fork lift truck 1. More specifically, coefficient K of a relatively large value is used if the running speed is high and coefficient K of a relatively small value is used if the running speed is low. This arrangement is made for varying the value of the data D*a* in accordance with the running speed of the fork lift truck 1 in order to reduce a count value of the travel distance pulse counter 65 to 0 in precedence to the time counter 66. A frequency-voltage converter 64 produces a signal $e_s$ which is proportionate to the frequency of the pulse signal Ps and supplies this signal to the multiplicator 63. The multiplicator 63 multiplies the data D*a* by a coefficient proportional to the signal $E_s$ and thereupon produces data D*a'* which is preset in the travel distance pulse counter 65. The data D*b* is directly preset in the time counter 66. These travel distance counter 65 and the time counter 66 are counted down each time the travel distance pulse Ps and the time pulse Pt are applied thereto.

While the fork lift truck 1 is running at a constant speed, the count of the travel distance pulse counter 65 becomes 0 in predecence to the time counter 66. A reset signal thereupon is produced from a NAND gate N1 and applied to the travel distance pulse counter 65 and the time counter 66 via an OR gate OR to reset these counters. Thereafter the data D*a'* and D*b* are respectively preset in the associated counters again. The above described operation is repeated while the fork lift truck 1 is travelling at a constant speed.

As the pallet 55*a* of the fork lift truck 1 comes into abutting engagement with the pallet 55*b* placed in the lane 54, the speed of the fork lift truck 1 is dropped. This causes the pulse period of the output pulse $P_s$ of the travel distance pulse generator 53 to be prolonged whereby the counting down operation of the travel distance pulse counter 55 is made slower. Since the time pulse generator 62 is producing the pulse signal Pt at the constant time interval t, the count of the time counter 66 becomes 0 in precedence to the travel distance pulse counter 65. A NAND gate N2 produces an output signal when the count of the time counter 66 has become 0. This output signal of the NAND gate $N_2$ is used as a load detection signal.

This load detection signal is applied to a running control unit (not shown) of the fork lift truck 1 to stop the truck 1 immediately.

It should be noted that the running speed of the fork lift truck 1 in the lane, the period t of the time pulse P*t* and the preset data D*a*, D*b* are so selected that the fork lift truck 1 can stop within a sufficiently short time after the pallet 55*a* abuts against the opposite pallet 55*b* without displacing the pallet 55*b* on which the load is placed.

What is claimed is:

1. A steering control system for an unmanned vehicle wherein an unmanned vehicle is switched at an intersection of two guide cables from a guided travel by means of one of said two guide cables to a programmed turning along a preset path independent from said guide cables and subsequently switched to a guided travel by means of the other guide cable, said steering control system comprising:

programmed turning control means for sequentially reading a steering angle instruction value from a memory storing a preset path represented by a function of a travel distance and a steering angle during turning thereby to control a steering unit of the vehicle in response to the steering angle instruction value;

means for moving the vehicle straight ahead with a steering angle 0 until the vehicle reaches the other guide cable after completion of the programmed turning;

guided travelling control means including a vehicle posture angle detection means capable of detecting a posture angle of the vehicle in accordance with a magnetic field of the guide cables and controlling the steering unit of the vehicle in response to the detected posture angle;

detection means for detecting reaching of the vehicle to the other guide cable regardless of completion of the programmed turning; and control means responsive to the output of said detection means for smoothly shifting the vehicle from the preceding travelling mode to the guided travel by means of said other guide cable.

2. A steering control system as defined in claim 1 wherein said memory employs, as a function of a reverse turning, a function obtained by shifting a function of a forward turning by a predetermined distance in a positive or negative direction of the travel distance.

3. A steering control system as defined in claim 1 wherein said memory programs functions of the travel distance and the steering angle separately with respect to a left turning and a right turning and uses one of said functions in accordance with an actual turning direction thereby to control the steering angle in accordance with the travel distance.

4. A steering control system as defined in claim 1 wherein said posture angle detection means comprises a pair of pick-up coils provided on both sides of the vehicle and in parallel to a central axis of the vehicle for producing a sum of induced voltages of said pick-up coils and another pair of pick-up coils provided on both sides of the vehicle and at right angles with the central axis of the vehicle for producing a difference between induced voltages of said other pair of pick-up coils, said sum voltage and said difference voltage being combined for controlling the steering unit in response to a phase and a level of the composite signal.

5. A steering control system as defined in claim 1 wherein the posture angle detection means comprises a pair of serially connected pick-up coils provided on both sides of the vehicle and substantially in parallel to a central axis of the vehicle for controlling the steering unit of the vehicle in response to a phase and level of a signal detected by said serially connected pick-up coils.

6. A steering control device as defined in claim 5 wherein the steering direction of the vehicle is controlled in accordance with whether the phase of said detected signal is in phase or of an opposite phase in relation to an alternating signal flowing through said guide cables whereas the amount of steering is controlled in response to the level of said detected signal.

7. For use in an unmanned vehicle of the type having a steering mechanism operative in response to a steering instruction signal supplied thereto and further having guide travelling means for guiding the travel of the vehicle along a guide cable which emanates an electromagnetic field, said guide travelling means providing to said steering mechanism a first steering instruction signal responsive to detection of that field, a system for guiding the vehicle through a turn at an intersection between two such guide cables comprising:

programmed turning function generator means, enabled when the turn is initiated, for monitoring the distance traveled by said vehicle during the turn and producing a second steering instruction signal that is a programmed function of said distance, said signal being supplied to and used by said steering mechanism during the turn in place of said first steering instruction signal, and turn completion control means for transferring control of said steering mechanism back to said guide travelling means when said vehicle has come within a preestablished distance and posture angle with respect to said second cable.

8. A system according to claim 7 wherein said turn completion control means comprises:

window separator means, operative after said vehicle has travelled to within the vicinity of said second cable and responsive to the output of said guide travelling meas, for determining if the posture angle of said vehicle with respect to said cable is sufficiently small by comparing the magnitude of said first steering instruction signal with a preestablished reference value and for enabling said transfer back only when said magnitude is less than said reference value.

9. A system according to claim 7 or 8 further comprising:

proximity detection means, responsive to said electromagnetic field, for establishing a signal indicative of the distance of said vehicle from a guide cable, said transfer back of control by said control means being inhibited when the output of said proximity detection means indicates that said vehicle is more than said preestablished distance from said second cable.

10. A system according to claim 7 wherein said programmed turning function generator means comprises:

programmed means for providing a preestablished function signal representing a steering angle as a function of distance travelled, and distance detection means on said vehicle for providing a signal indicative of the distance travelled thereby from the initiation of said turn, said programmed means providing said function signal in accordance with said distance travelled, said second steering instruction signal corresponding to said function signal.

11. A system according to claim 8 wherein said magnitude comprising is enabled when the vehicle has travelled beyond a certain preset distance from the initiation of said turn.

* * * * *